US005229910A

United States Patent [19]

Kasahara

[11] Patent Number: 5,229,910

[45] Date of Patent: Jul. 20, 1993

[54] BILLBOARD DEVICE

[75] Inventor: Keiji Kasahara, Kakegawa, Japan

[73] Assignee: Abisare Co., Ltd., Shizoka, Japan

[21] Appl. No.: 659,263

[22] Filed: Feb. 22, 1991

[30] Foreign Application Priority Data

Oct. 2, 1990 [JP] Japan .................................. 2-265337

[51] Int. Cl.5 ........................................ H02N 13/00

[52] U.S. Cl. ................................ 361/234; 296/21; 40/593

[58] Field of Search .................. 361/233, 234; 29/900; 226/94; 296/21; 248/466; 211/1.5, 45; 40/643, 650, 651, 657, 426, 589, 593, 594, 600, 620

[56] References Cited

U.S. PATENT DOCUMENTS

| | | | |
|---|---|---|---|
| 2,293,887 | 8/1942 | Chamberlain | 361/234 |
| 3,359,469 | 12/1967 | Levy et al. | 361/234 |
| 3,448,356 | 6/1969 | Testone | 361/234 |
| 3,897,997 | 8/1975 | Kalt | 350/161 |
| 3,916,270 | 10/1975 | Wachtler et al. | 361/234 |
| 4,224,557 | 9/1980 | Sasaki | 318/116 |
| 4,225,369 | 9/1980 | Felchlin | 156/71 |
| 4,751,609 | 6/1988 | Kasahara | 361/234 |

FOREIGN PATENT DOCUMENTS

| | | | |
|---|---|---|---|
| 3619961 | 11/1987 | Fed. Rep. of Germany . | |
| 2-129196 | 10/1990 | Japan . | |

OTHER PUBLICATIONS

European Search Report and Annex.

*Primary Examiner*—A. D. Pellinen
*Assistant Examiner*—David Osborn
*Attorney, Agent, or Firm*—Sandler Greenblum & Bernstein

[57] ABSTRACT

The invention relates to a billboard device suitable for use in posting a sheet of advertisement of guide bill, in particular, on the structure of a vehicle. The billboard device eliminates the necessity of using elastic material such as cardboard for sheets or bills and does not impair the design aesthetics of the bills. The billboard device includes an electrostatic attracting plate which has an attracting layer of dielectric material and at least one pair of comb-tooth shaped electrodes formed on the back surface of the attracting layer. The electrostatic attracting plate is warped so that the attracting layer is concave on the front surface. Voltage is applied to central comb-tooth electrodes first, and then the comb-tooth electrodes surrounding the central electrodes.

12 Claims, 4 Drawing Sheets

BILLBOARD DEVICE

BACKGROUND OF THE INVENTION

This invention relates to a billboard device, or more specifically to a device suitable for use in posting up an advertisement or information sheet on structures such as vehicles.

DESCRIPTION OF RELATED ART

In a vehicle such as a train or a bus, for example, advertisement sheets or posters are put up on a curved surface of a wall between the ceiling and the upper end of the windows. The conventional billboard means widely used for putting up these bills of advertisement or posters so that they are detachable from the wall are shown in FIGS. 6 and 7. The following paragraphs describe the conventional billboard means with reference to the drawings.

(a) Slide Type (FIG. 6)

The slide type billboard means includes a pair of lateral grooved rails 20, 20, which are arranged along the upper and lower edge of the poster space, facing each other. A sheet of bill N, warped against the elasticity of the sheet to comply with the curvature of the wall, is inserted from either left or right ends of the grooved rails 20, 20, an the upper and lower edges of the sheet fit in the rails. The sheet of bill N is slid laterally to a specified position and is secured there by making use of the elastic restoration property of the sheet of bill N.

(b) Band Type (FIG. 7)

The band type billboard means comprises a pair of flexible and elastic transparent strip bands 21, 21. The strip bands 21, 21 are placed on the right side and the left side of a sheet of bill to be posted up and are bent against the elasticity to comply with the curvature of the wall, with the upper ends being hinged rotatably on the wall and with the lower ends being engaged rotatably with the wall. To post up a sheet of bill N, the bands 21, 21 are rotated with a click and separated from the wall to form a space between the wall and the bands 21, 21. The sheet of bill N is inserted from either left or right side of the bands 21, 21 to a specified position in the space. The bands 21, 21 are then rotated back with a click and are fit to the wall. Thus, the sheet of bill N is secured in place by the elastic pressing force of the bands pressed against the wall.

SUMMARY OF THE INVENTION

The former type of billboard means described in (a) secures a sheet of bill N, utilizing the elastic restoration property of the sheet N. The problem with the device is that the sheet of bill N needs to be made of elastic materials such as cardboards for adequate elastic force. The latter type described in (b) secures a sheet of bill N, utilizing the pressure of the strip bands 21, 21 against the wall. For the latter type (b), therefore, the sheet of bill N needs not have as great an elasticity as for what is required with the former type (a). However, if the sheet of bill N is not elastic enough to maintain its own shape, a part of the sheet between the strip bands 21, 21 may be raised off the wall, which is visually offensive and may be difficult, if not impossible to read. Further the design of the bill is impaired. In addition, in the latter case of (b), since the bands 21, 21 are placed over the front face of the sheet of bill N, the design of the bill is also detracted from even if the bands are transparent.

To solve the above problems, the object of the present invention is to provide a billboard device which eliminates the necessity of using elastic materials such as cardboards for sheets of bills and which does not impair the design of bills.

To achieve the above object, the billboard device according to the present invention comprises an electrostatic attracting plate having (a) an attracting layer made of dielectric material and (b) at least a pair of comb-teeth shaped electrodes formed on the back surface of the attracting layer, the electrostatic attracting plate being warped so that the front surface of the attracting layer is concave.

According to the present invention, a sheet of bill is secured in place as it is attracted by the electrostatic attracting force of the electrostatic attracting plate. Therefore, the materials for the sheet of bill to be held by the device need not be restricted to the elastic materials such as cardboards. Any desirable thin paper may be used. In addition, since the sheet of bill is uniformly attracted on the back surface by the electrostatic attracting force, it cannot be raised off the wall. Moreover, since no members are placed over the sheet of bill to hold the same, the design of the bill is not hampered.

According to the present invention, the electrostatic attracting plate is warped so that the front surface of the attracting layer is concave. Therefore, the surface of the attracting plate on the side facing the center of the curvature, namely, the front surface of the attracting layer is contracted. Consequently, when d.c. voltage is applied to the pair of comb-teeth shaped electrodes, the density of electric lines of force is greater and the electric path is shorter on the front surface of the attracting layer, thus resulting in higher induced electrostatic charge and therefore resulting in greater electrostatic attracting force, compared with that of a flat electrostatic attracting plate manufactured for the same specifications. This means the present invention allows the same electrostatic attracting force to be maintained for a longer time with the same power consumption that of conventional electrostatic plate.

It is preferable that an insulating adhesive layer be formed over the back surface of the electrostatic attracting plate on the side of the comb-teeth shaped electrodes, to permit the attracting plate to be attached to a structure through the insulation adhesive layer. Alternatively, an insulation layer and an adhesive layer may be laminated in this order over the electrostatic attracting plate on the back side of the comb-teeth shaped electrodes, allowing the attracting plate to be attached to a structure through the adhesive layer. The insulation layer may be a support film made of insulating materials.

The billboard device is conveniently installed if the insulation adhesive layer or the insulation layer is provided in advance on the attracting plate. Alternatively, an insulating adhesive agent or an adhesive agent may be applied to the concave wall of the structure to which the billboard device is to be installed, to form an insulation adhesive or adhesive layer on the wall before the electrostatic attracting plate is attached to the wall.

Preferably, at least one of the pairs of comb-teeth shaped electrodes is provided in the center of the back surface of the attracting layer, with the other pair or pairs provided around the center. It is preferable that d.c. voltage is applied sequentially with the time difference first to the center pair or pairs of electrodes and then to the surrounding pair or pairs of electrodes as it is controlled by a delay relay means, and accordingly an electrostatic attracting force is generated on the attracting layer sequentially from the center to the surrounding area. Thus, according to the present invention, it is possible to adjust the position of the sheet of bill prior to the generation of electrostatic attracting force in the surrounding area, permitting easy setting of sheet of bill without an air layer being formed between the sheet of bill and the attracting layer.

An applied polarity reversing means may be provided to invert the polarity of d.c. voltage applied to the pairs of comb-teeth shaped electrodes. When a sheet of bill is set on the device for a long time, it will become charged either positively or negatively, resulting in a reduced electrostatic attracting force. In that case, if the polarity is reversed, the required electrostatic attracting force is revived.

Other objects of the present invention will become apparent from the detailed description given hereinafter.

However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 1 through 4 illustrate an embodiment of the billboard device according to the present invention:

FIG. 1 is a perspective view of a billboard device of the present invention as set on the wall in a vehicle, FIG. 3 shows a schematic pattern of a pair of comb-teeth shaped electrodes used in the present invention.

DETAILED DESCRIPTION OF THE PREFERRED EMBODIMENTS

An embodiment of the billboard device according to the present invention is described below with reference to the accompanying drawings.

Figure 1:
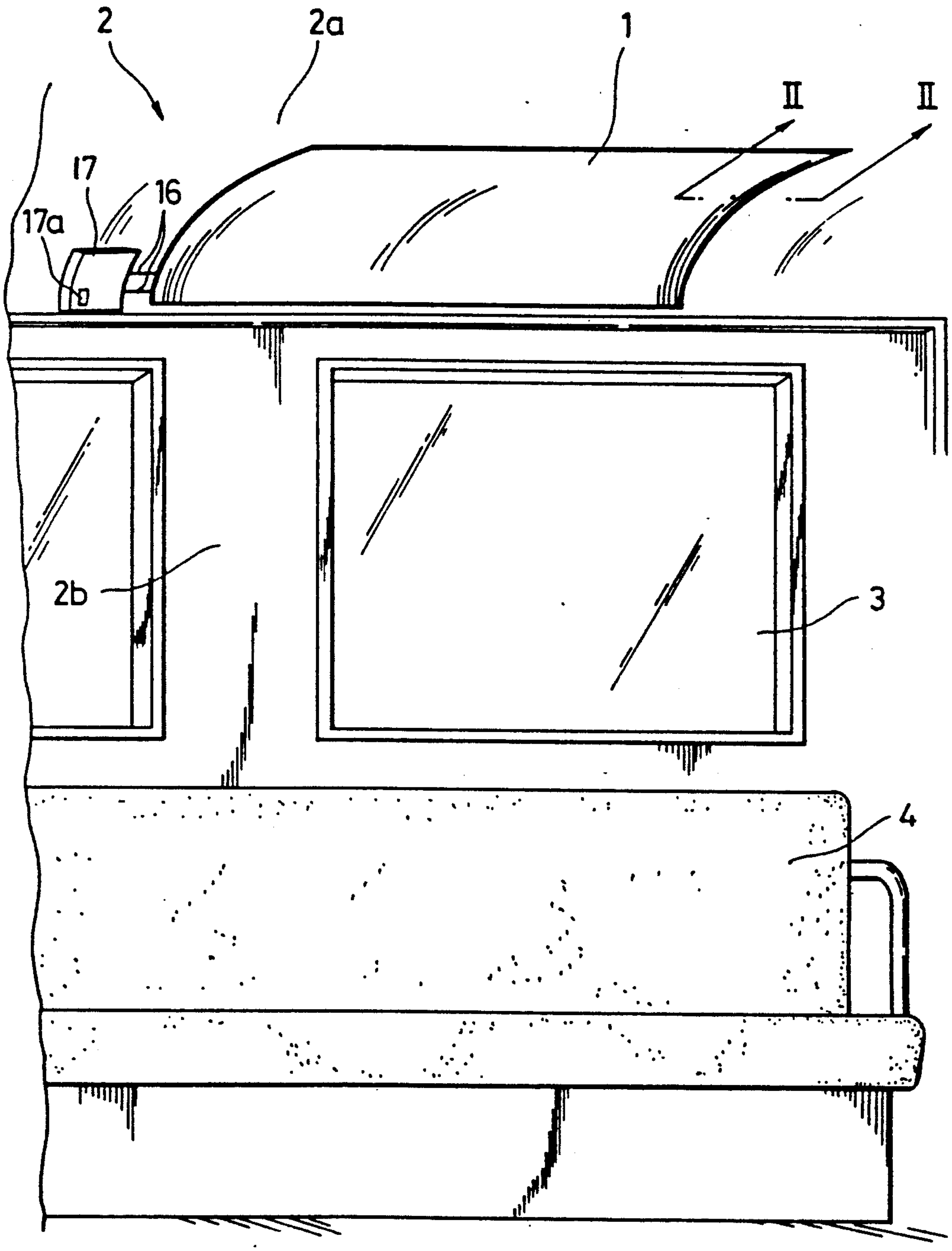
Figure 2A:
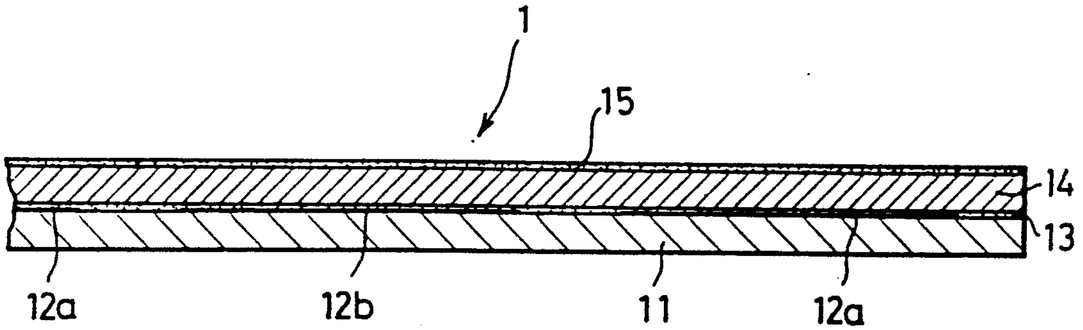
FIG. 2(A) is a cross section of the electrostatic billboard of the present invention along the line II—II of FIG. 1.
Figure 2B:
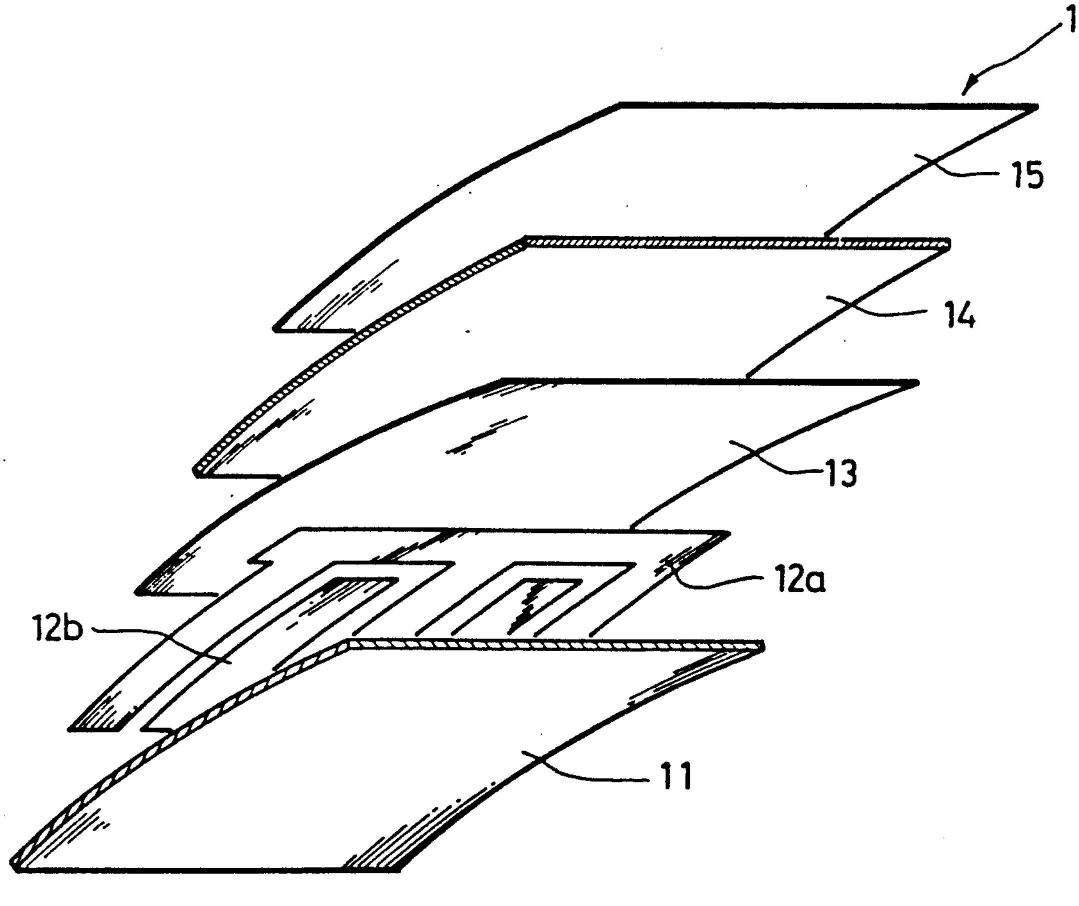
FIG. 2(B) is a perspective view of the exploded electrostatic billboard.
Figure 3:
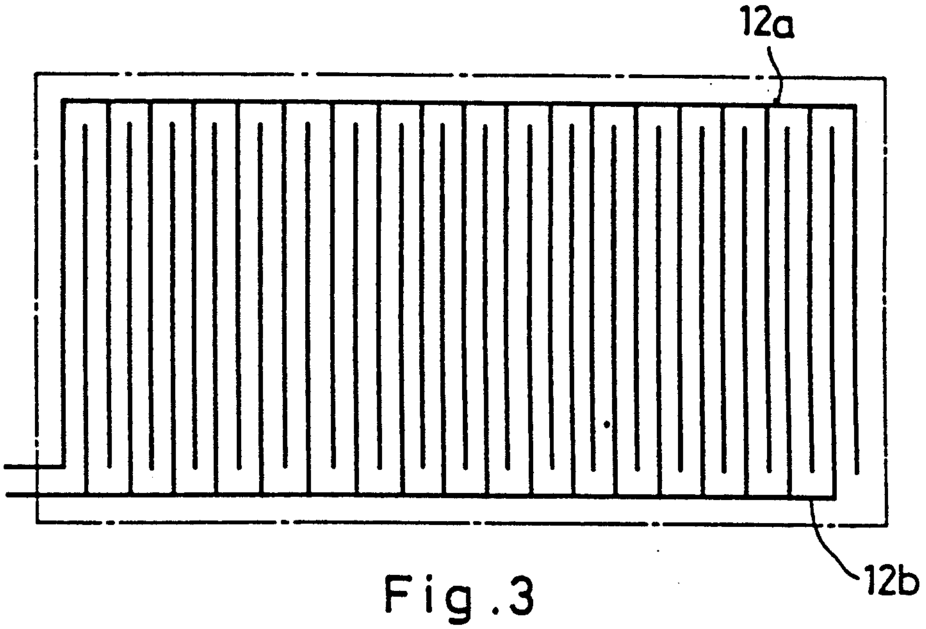

FIG. 1 shows a thin, 800×2,100 mm square electrostatic billboard 1 set on the wall in a vehicle 2, between the ceiling 2*a* and the side wall 2*b* having windows 3 and seats 4. The billboard 1 is warped so that the front surface is concave with a radius of curvature of 50 to 80 cm. The structure of the electrostatic billboard 1 is as follows:

Referring to FIGS. 2(A) and 2(B), a pair of electrically separated comb-tooth shaped electrodes 12*a* and 12*b* is formed on the entire back surface of an attracting layer 11 of dielectric material, each of comb-teeth portions of one electrode being disposed between every two comb-tooth portions of the other electrode. FIG. 3 shows the pattern of the pair of electrodes. The attracting layer 11 and the pair of electrodes 12*a* and 12*b* constitute an electrostatic attracting pate provided in the present invention. When d.c. voltage of about 500 to 5,000 V is applied to the pair of electrodes 12*a* and 12*b*, electrostatic attracting force is generated on the front surface of the attracting layer 11, thus attracting and securing the sheets of advertisement or information bill (not shown). The attracting layer 11 is about 200 to 1,000 $\mu$m thick and provides a volume resistivity of about $10^{12}$ to $10^{14}$ $\Omega$cm and a dielectric constant of 4.0 to 12.0. The attracting layer 11 is made of dielectric synthetic resin such as polyvinylchloride, methyl methacrylate, ABS resin, polyethylene, acetal resin, polyester or a mixture of some of these resins, mixed with conductive carbon, nickel or copper powder. The comb-teeth shaped electrodes 12*a* and 12*b* are about 20 to 50 $\mu$m thick and about 10 mm wide. Each tooth of one electrode is spaced apart by about 3 mm from each of two teeth of the other electrode. The electrodes are formed on the back surface of the attracting layer 11 by screen-printing in conductive carbon ink or by etching of copper foil.

An insulation layer 13 is laminated on and covering the back surface of the electrostatic attracting plate comprising the attracting layer 11 and the comb-teeth shaped electrodes 12*a* and 12*b*. A support film 14 for securing dimensional accuracy and an adhesive layer 15 are further formed in this order on the insulation layer 13. The insulation layer 13 is about 30 to 50 $\mu$m thick and provides a volume resistivity of $10^{13}$ $\Omega$cm or greater. The insulation layer 13 is produced by heat-compressing polyvinylchloride or applying fused insulating synthetic resin onto the back surface of the attracting layer 11 and the comb-teeth electrode 12*a*, 12*b*. The support film 14 is about 200 $\mu$m thick and provides a high insulation property with a volume resistivity of $10^{14}$ $\Omega$cm or greater. The support film 14 is made of polyester, polycarbonate, ABS resin, polyvinylchloride or polybutylene phthalate (PBT). The adhesive layer 15 is about 30 to 50 $\mu$m thick. It is formed by coating the support film 14 with thermally resistant and vibration-resistant pressure sensitive adhesive agent such as acrylic copolymer or aromatic hydrocarbon resin.

The electrostatic billboard 1 or, in other words, the electrostatic attracting plate is attached to the wall in a vehicle 2 via the adhesive layer 15. Before the billboard 1 is attached to the wall, the adhesive layer 15 is covered with a peel-off paper.

About 500 to 5,000 V of d.c. voltage is applied from a power supply unit 17 through leads 16 to the pair of comb-teeth shaped electrodes 12*a* and 12*b*. The power supply unit 17 comprises a power source such as a dry cell or other battery, a d.c./a.c. converter and a voltage doubler rectifier, which are connected compactly with one another in a printed circuit so that the unit generates a required d.c. voltage of about 500 to 5,000 V. The unit is provided with a power on/off switch 17*a*.

Figure 4A:
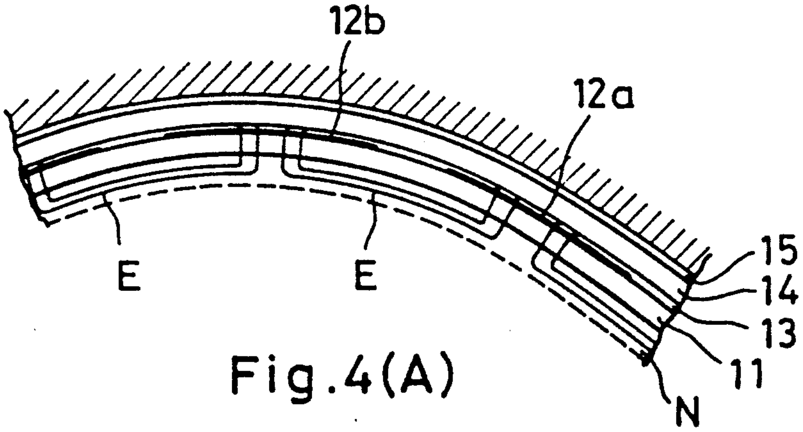
FIGS. 4(A) and 4(B) show the electric field patterns on warped and flat electrostatic billboards, respectively, which attract a sheet of bill electrostatically.
Figure 4B:
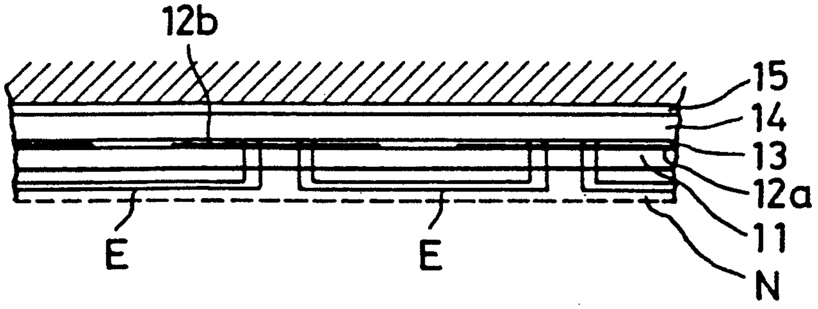

To secure a sheet of bill on the electrostatic billboard 1, the sheet is applied on the front surface of the billboard 1 or, in other words, on the front surface of the attracting layer 11, and the switch 17a of the power supply unit 17 is turned on. Then, a required d.c. voltage is applied to the pair of comb-teeth shaped electrodes 12a and 12b, generating electrostatic attracting force instantaneously over the entire surface of the attracting layer 11. The sheet of bill is kept attracted by the electrostatic billboard 1 until the switch 17a is turned off so that there is no voltage application to the electrodes 12a and 12b. Thus, according to the present invention, electrostatic attracting force is generated over the entire surface of the attracting layer 11 or the electrostatic billboard 1. Therefore, the billboard of the present invention is capable of securing a larger sheet of bill than the conventional one is. Furthermore, since the electrostatic billboard 1 is curved so that the attracting layer 11 is concaved on the front surface, the attracting layer 11 is contracted on the front surface, as shown in FIG. 4(A). As a result, the attracting layer 11 which is located on the center of the curvature provides a higher density of electric lines of force E having shorter electric paths due to the compression on the side of the center of the curvature as compared to a flat attracting layer 11 using an equivalent voltage source, as shown in FIG. 4(B). Thus, the induced electrostatic charge per unit area increases, resulting in a greater electrostatic attracting force exerted on the sheet of bill N.

In the above embodiment of the invention, only one sheet of bill is electrostatically held by the billboard. Since the invention permits the use of a thinner sheet of material for a bill, a plural number of thin sheets of bills in layers may also be attracted and secured by the billboard. In such a case, each sheet should have a thickness in the $\mu$m range, a smaller electric resistance than the attracting layer 11 and smooth surfaces, so that plural number of sheets in layers can be made substantially into one sheet. Thus, since the billboard of the present invention is capable of attracting plural number of sheets in layers, it is possible to add messages later and to overlay a transparent color film to enhance the chromatic display effect.

Figure 5:
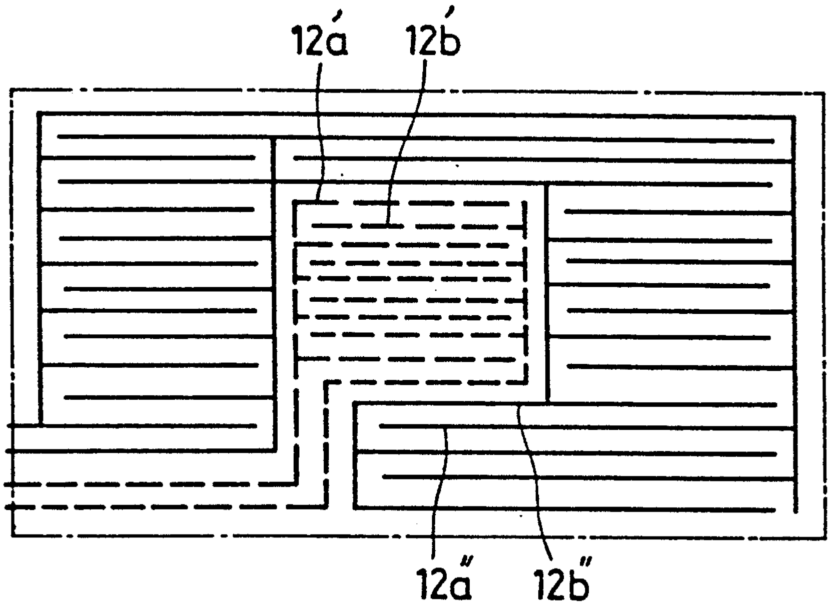
FIG. 5 shows another schematic pattern example of a pair of comb-teeth shapes electrodes corresponding to the one shown in FIG. 3.
Figure 6:
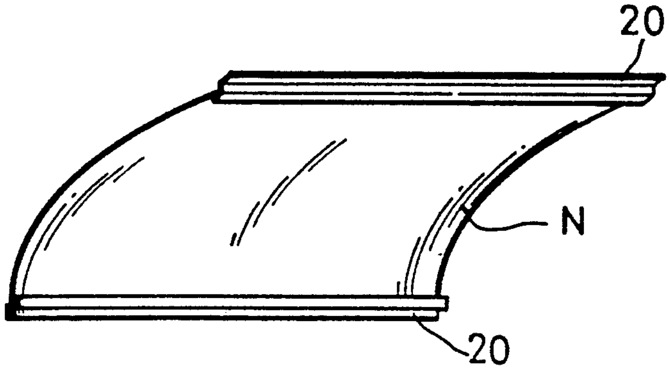
Fig.6 PRIOR ART
FIGS. 6 and 7 are perspective views of conventional arts.
Figure 7:
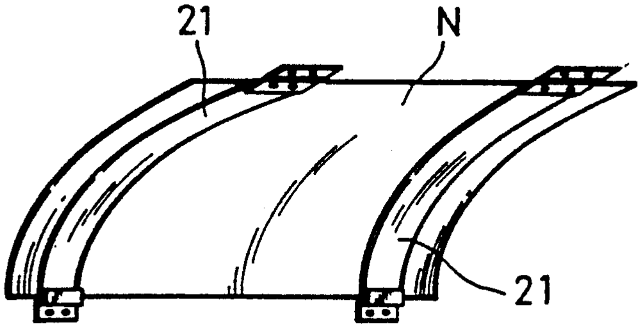
Fig.7 PRIOR ART

According to the present invention, more than one pair of comb-teeth shaped electrodes 12a and 12b may be used instead of one pair as described in the above embodiment. In such a case, as is disclosed in the Japanese Utility Model Publication TOKKAIHEI-2-129196 and shown in FIG. 5 of the present invention, at least one pair of comb-teeth shaped electrodes 12a' and 12b' is provided in the center of the back surface of the attracting layer 11, and another pair of comb-teeth shaped electrodes 12a" and 12b" is provided in the surrounding area. For the second embodiment of the invention, voltage application from the power supply unit 17 may be controlled by a delay relay 17b so that voltage is applied first to the central pair of comb-teeth shaped electrodes 12a' and 12b' and then about two to five seconds later to the surrounding pair of electrodes 12a" and 12b". Due to this controlled voltage application, electrostatic attracting force is generated on the attracting layer 11 sequentially from the center to the surrounding area. According to this embodiment of the invention, regardless of the size and state of a sheet of bill to be put up, it is possible to adjust the position of the sheet of bill and to expel air between the sheet of bill and the surface of the attracting layer 11 before the peripheral edges of the bill become attracted. That is, facilitation of a smooth application of the sheet is enhanced of bill from being raised, making it easy to set the sheet of bill onto the billboard.

The power supply 17 of the present invention may contain an applied polarity reversing means, as is disclosed in U.S. Pat. No. 4,751,609, to invert the polarity of the voltage applied to the pair or pairs of comb-teeth shaped electrodes. The electrostatic attracting force of the attracting layer 11 diminishes over time as the layer 11 is electrically charged due to the electret phenomenon. However, the applied polarity reversing means reversed the polarity of the applied voltage so that the electrostatic attracting force is revived.

According to the above embodiments of the invention, the electrostatic billboard 1 is attached to the wall in a vehicle 2 through the adhesive layer 15. Alternatively, synthetic resin adhesive of arcylic, olefin or epoxy series with a volume resistivity of about $10^{15}$ Ωcm may be arranged to form a 30 to 50 $\mu$m thick insulation adhesive layer directly on the back surface of the electrostatic attracting plate comprising the attracting layer 11 and the pair of pairs of electrodes 12a and 12b. In such a case, the billboard 1 is attached to the wall in a vehicle 2 through the insulation adhesive layer 15.

In the above description of the embodiments of the invention, the billboard device is applied in a vehicle such as a train and a bus. Needless to say, the billboard device of the present invention is applicable to buildings and advertising pillars.

What is claimed is:

1. A billboard device comprising an electrostatic attracting plate including an attracting layer made of dielectric material and having a front and back surface and at least a pair of comb-tooth shaped electrodes formed on the back surface of said attracting layer, said electrostatic attracting plate being warped so that said attracting layer is concave on said front surface, and wherein an insulating adhesive layer is formed on the back surface of said electrostatic attracting plate on the side of said comb-tooth shaped electrodes, permitting the electrostatic attracting plate to be attached to the wall of a vehicle through said insulating adhesive layer, wherein said electrostatic attracting plate is warped to comply with the curvature of the wall of the vehicle between the ceiling and the side wall.

2. A billboard device as described in claim 1, further comprising an applied polarity reversing means for reversing the polarity of the d.c. voltage applied to said pairs of comb-tooth shaped electrodes.

3. A billboard device as described in claim 1, wherein said at least a pair of comb-tooth shaped electrodes further comprises at least two pairs of comb-tooth shaped electrodes, at least one of said pairs being formed substantially in the center of the back surface of said attracting layer, while at least one other of said pairs being formed in the surrounding area, d.c. voltage being applied to said pairs of electrodes sequentially from said at least one pair being formed substantially in the center to said at least one other of said pairs being formed in the surrounding area.

4. A billboard device as described in claim 1, further comprising applied polarity reversing means for reversing the polarity of the d.c. voltage to said pairs of comb-tooth shaped electrodes.

5. A billboard device comprising an electrostatic attracting plate including an attracting layer made of dielectric material and having a front and back surface and at least a pair of comb-tooth shaped electrodes formed on the back surface of said attracting layer, said electrostatic attracting plate being warped so that said attracting layer is concave on said front surface, wherein an insulating layer and an adhesive layer are formed in this order on said back surface of said electrostatic attracting plate adjacent said comb-tooth shaped electrodes, permitting said electrostatic attracting plate to be attached to the wall of a structure through said adhesive layer, in which said structure is a vehicle and in which said electrostatic attracting plate is warped to comply with the curvature of the wall of the vehicle between the ceiling and the side wall.

6. A billboard device as described in claim 5, wherein said insulating layer comprises a support film made of insulating material.

7. A billboard device as described in claim 6, wherein said at least a pair of comb-tooth shaped electrodes further comprises at least two pairs of comb-tooth shaped electrodes, at least one of said pairs being formed substantially in the center of the back surface of said attracting layer, while at least one other of said pairs being formed in the surrounding area, d.c. voltage being applied to said pairs of electrodes sequentially from said at least one pair being formed substantially in the center to said at least one other of said pairs being formed in the surrounding area.

8. A billboard device as described in claim 6, further comprising applied polarity reversing means for reversing the polarity of the d.c. voltage to said pairs of comb-tooth shaped electrodes.

9. A billboard device as described in claim 5, wherein said at least a pair of comb-tooth shaped electrodes further comprises at least two pairs of comb-tooth shaped electrodes, at least one of said pairs being formed substantially in the center of the back surface of said attracting layer, while at least one other of said pairs being formed in the surrounding area, d.c. voltage being applied to said pairs of electrodes sequentially from said at least one pair being formed substantially in the center to said at least one other of said pairs being formed in the surrounding area.

10. A billboard device as described in claim 5, further comprising applied polarity reversing means for reversing the polarity of the d.c. voltage to said pairs of comb-tooth shaped electrodes.

11. A billboard device comprising an electrostatic attracting plate including an attracting layer made of dielectric material and having a front and back surface and at least a pair of comb-teeth shaped electrodes formed on the back surface of said attracting layer, said electrostatic attracting plate being warped so that said attracting layer is concave on said front surface, and wherein said electrostatic attracting plate is warped to comply with the curvature of a walled structure, in which said structure is a vehicle and in which said electrostatic attracting plate is warped to comply with the curvature of the wall of the vehicle between the ceiling and the side wall.

12. A billboard device comprising an electrostatic attracting plate including an attracting layer made of dielectric material and having a front and back surface and at least two pairs of comb-tooth shaped electrodes formed on the back surface of said attracting layer, said electrostatic attracting plate being warped so that said attracting layer is concave on said front surface, in which at least one of said pairs of comb-tooth shaped electrodes is formed in the center of the back surface of said attracting layer, at least another pair of said at least two pairs being formed in the surrounding area, d.c. voltage being applied to said pairs of electrodes sequentially from the central pair to the surrounding pair.

* * * * *